United States Patent [19]
Yim

[11] Patent Number: 5,649,480
[45] Date of Patent: Jul. 22, 1997

[54] TOUCH-READABLE PRODUCT AND ASSOCIATED PROCESS

[76] Inventor: Joan Marilyn Yim, 4122 Bridlepath Trail, Mississauga, Ontario, Canada, L5L 3E9

[21] Appl. No.: 474,172

[22] Filed: Jun. 7, 1995

[51] Int. Cl.⁶ .................................................... B41M 1/12
[52] U.S. Cl. .......................... 101/129; 400/109.1; 434/113
[58] Field of Search .............................. 101/114, 127, 101/128.21, 128.4, 129; 400/109.1; 434/113, 114

[56] References Cited

U.S. PATENT DOCUMENTS

| | | | |
|---|---|---|---|
| 2,616,198 | 11/1952 | Sewell | 41/1 |
| 3,372,638 | 3/1968 | Tripp | 101/114 |
| 3,432,328 | 3/1969 | Vaurid | 117/38 |
| 3,442,207 | 5/1969 | Johnson | 101/114 |
| 3,924,019 | 12/1975 | Jacob | 427/14 |
| 3,987,725 | 10/1976 | Scanlin | 101/128.4 |
| 4,571,190 | 2/1986 | Zagler et al. | 434/114 |
| 5,046,415 | 9/1991 | Oates | 101/128.21 |
| 5,322,565 | 6/1994 | Zachman et al. | 101/114 |
| 5,410,957 | 5/1995 | Tanaka et al. | 101/127 |
| 5,507,649 | 4/1996 | Troudet | 434/233 |

FOREIGN PATENT DOCUMENTS

| | | |
|---|---|---|
| 800548 | 6/1988 | European Pat. Off. |
| 786929 | 9/1983 | Japan |
| 200045 | 12/1982 | Netherlands |
| 700038 | 5/1987 | Norway |
| 827003 | 1/1958 | United Kingdom |

*Primary Examiner*—Christopher A. Bennett
*Attorney, Agent, or Firm*—Rothwell, Figg, Ernst & Kurz, P.C.

[57] ABSTRACT

The economic production of raised print characters such as Braille is achieved by a silk screen printing process, using a rotational printing machine in combination with high viscosity, "U/V" inks that make possible the depth of deposition and character solidity necessary for achieving the required tactile effect in order to be "readable" by touch. The high body ink of the thus formed characters is cured rapidly by exposure to U/V light, so that the high drying rate thus obtained enables the achievement of economically effective, high rates of production. It is found that raised patterns of significantly lesser prominence than for embossed Braille, as produced by the printing process, are more durable, being substantially less crushable than an embossed Braille product, and are readable on a short-term basis, even by trainee "readers". The desired "point" value of height of the superimposed characters is achieved by build-up of the screen thickness, by way of additional layers of the high viscosity coating emulsion through which is etched the passages that the printing ink passes through.

17 Claims, 2 Drawing Sheets

TOUCH-READABLE PRODUCT AND ASSOCIATED PROCESS

TECHNICAL FIELD

This invention is directed to a touch-readable product having raised, printed characters such as Braille dots, and to a silk-screen printing process for the manufacture thereof.

BACKGROUND ART

The use of tactile-readable patterns has wide application primarily at present in the use, by sight impaired or blind people, of Braille characters. These characters each comprise a particular arrangement of raised dots, which are generally imprinted out era planar paper or cardboard medium by embossment. The embossing process is both slow and expensive.

As an alternative to embossment, the use of thermography, does not appear to be successful, presumably on a basis of the high costs involved, and other possible technical problems.

In efforts to achieve lower cost, touch-readable products, many attempts have been made on the basis of silk-screen printing, without however achieving at an acceptable cost characters of sufficient prominence to enable tactile distinction thereof.

In some previous, experimental work in this field in which I participated, a flat bed silk screen was used in cooperation with an underlying stationary planar sheet upon which the ink was deposited. It was found that with this arrangement the speed of application was insufficient, leading to slumping so that a satisfactory economic result and an acceptable standard of readability could not be achieved. Also, in using the flat bed method of silk screening the maximum rate of production that could be achieved was in the range of 150 to 200 sheets per hour, which is highly uneconomical, and cost inefficient.

In case of known prior art, this includes the following patents:
PCT Norway No. 8700038, Apr. 20, 1987
PCT Netherlands No. 8200045, Dec. 15, 1982
PCT Europe No. 8800548, Jun. 22, 1988
U.S. Pat. No. 2,616,198, H. P. Sewell, Nov. 4, 1952
U.S. Pat. No. 3,372,38, K. F. Tripp, Mar. 12, 1968
U.S. Pat. No. 3,432,328, Vaurio, Mar. 11, 1969
U.S. Pat. No. 3,442,207, W. E. Johnson, May, 6, 1969
U.S. Pat. No. 3,924,19, Jacob, Dec. 2, 1975
U.S. Pat. No. 3,987,725, Scantlira Oct. 26, 1976
U.S. Pat. No. 4,571,190, Zagler et al., Feb. 18, 1986
U.S. Pat. No. 5,046,415, Oates, Sep. 10, 1991
British Patent No. 827003, Jan. 3, 1958
Japanese Patent No. 83786929,

DISCLOSURE OF THE INVENTION

I have found that a large demand exists for touch readable texts, such as short communications and labels, at an economic price.

Also, I have discovered that the standard for Braille printing established by Congress of the United States is unduly high, particularly with regard to the height of the dots used in the Braille characters, and that less prominent dots may be provided, economically, using high viscosity inks and a machine printer, which dots are touch readable.

I have found, by using a rotary machine upon which the paper or other print medium is carried, in combination with a superposed screen imprinted with the desired characters, that a sufficiently high viscosity, U/V ink can be applied through the screen in a thickness which is adequate to achieving a readable Braille-reading standard, and which can be relatively rapidly cured.

To achieve a Braille-reading capability requires both height and definition (i.e. prominence or "sharpness"), while achieving sufficiently high rates of production to prove economically viable.

The stipulated standard for Braille characters, as defined in the Library of Congress for the United States of America requires "dots" having a height of 0.019 inches (19 Points, or 0.4826 mm) and having a diameter at their base of 0.057 inches (1.4478 mm).

A hemispherical dot is considered by Braille technicians to be ideal, in terms of touch-readability.

The associated standard Braille requirements are:
  dot spacing, centre to centre is 0.092 inches: the space between dots of adjacent "cells" (characters) is 0.245 inches (centre to dot centre); the line spacing (between adjacent dots) is 0.4 inches.

While the Library of Congress Braille specification is desirable for continuous reading so as to minimize strain and fatigue of the reader, I have found that a reduced standard, as low as 6 points in height may be successfully adopted in instances of brief use, where a protracted reading effort is not required.

Thus, in instances such as greeting cards or labels, a reduced height of Braille is found to be readable. I have found the range 6 Points and above to be readable.

In compensation for the reduced height of these touch-readable patterns, I have found, in the case of Braille, that increasing the diameter of the dots, and increasing both the spacing between individual dots of a Braille character, and the distance between adjacent characters and between lines of characters, has facilitated and enabled the reading of the characters, even by a "learner" group of Braille readers.

In the case of a cylinder machine, the cylinder of the machine revolves about a fixed axis at a predetermined rate, and picks up a blank sheet that is to be imprinted, at each half revolution. The bed upon which the silk screen is carried is located over the cylinder. The bed is substantially planar and oscillates in synchronism with the linear speed of the blank sheet, such that the instant highest portion, i.e. the line of apogee of the sheet, underlies and is in momentary synchronism with the travelling screen, which is spaced a predetermined selected, adjustable distance above the sheet.

A pool of ink located upon the upper surface of the silk screen is damned up by a squeegee to form an ink concentration located over the line of apogee, so that the ink flows down through the interstices of the screen and onto the sheet.

In operation the squeegee deflects the silk screen downwardly by up to about ⅛ inch, to contact the sheet surface.

I have found with use of this arrangement and a high viscosity ink, that sufficient ink is deposited through the screen onto the paper or other medium to achieve dots of sufficient height to achieve reliable touch-readability.

By using an inclined somewhat soft squeegee arranged in converging relation with the direction of screen travel, a downward flow component is applied to the ink flood, to achieve a high rate of ink displacement through the silk screen. An outwardly convex radius of the squeegee, at the point of contact with the screen, appears to enhance the "pumping" effect of the squeegee on the ink pool. The effectiveness of the squeegee is also a function of its softness.

While a screen such as 110 mesh has been used successfully, coarser mesh screens in the range 90 mesh and ranging down to 60 mesh appear to be successful. The coarser mesh screens appear best suited to rotary presses.

It appears that in operation the sheet apogee zone, in contacting relation with the underside of the screen, is effectively sealed from the atmosphere, by way of the ink-filled open interstices of the screen, and by the adjoining photo-emulsion sealed screen portions, such that the rotation of the cylinder creates a divergent, wedge-shaped zone, and serves to generate a downward inductive pumping action so as to supplement the downward flow of the ink from the pool onto the print medium.

Rotation of the cylinder moves the sheet downwardly away from the underface of the screen, possibly drawing down a further amount of the ink through the related screen interstices. At the same time, the related potions of the respective ink columns that remain resident in the silk screen at the time of separation from the deposited ink column portions exert an upward component of tensional force on the conjoined ink column portions deposited upon and adhering to the sheet, due to the surface tension and viscosity effect of the ink. The moving sheet with its lines of deposited ink character portions is subject to centrifugal force, due to the rotation of the drum, which also tends to limit or preclude slumping of the deposited ink potions that form the characters.

In the case of Braille characters, the individual dots are thus precipitated approximately as hemispheres, and the U/V drying process is sufficiently rapid that this condition of the dots is substantially maintained, and made permanent.

Location of the U/V curing station in close proximity to the off-going side of the cylinder serves to shorten the lapsed time in which curing of the ink is effected, thereby minimizing the time available for adverse slumping of the deposited ink to occur.

Thus, the present invention provides a medium imprinted with a raised pattern of predetermined prominence and definition to provide a desired degree of tactile recognition, using a high viscosity U/V (ultra-violet) curable ink, applied m the medium on a rotational machine.

It is contemplated that a rotary press which operates on the same dynamic principles, with the ink and squeegee located within the perimeter of a rotatable, photo imprinted wire screen may also be used in order to achieve readable Braille characters.

The subject process may be used to produce Braille characters upon a substrata, such as paper, mylar etc.

It is preferable in carrying out the subject process, that the paper or cardboard be of sufficiently high gloss to minimize absorption of the ink deposits into the surface of the medium. A paper having a porous surface leads to an undersireably high level of absorption of the ink therein.

In order to ensure effective ink adherance on the surface of the medium a corona-treated stock or coated paper may be used.

In the case of the ink, where localized ink depositions such as Braille "dots" are required, it is believed to be important to avoid the presence of large air bubbles in the ink, so that in some instances the use of a defoaming agent may promote the quality and density of the final tactile "image".

The invention thus provides a printed surface having a precise, predetermined raised pattern thereon whereto the ink from which the pattern is formed is a high viscosity ink that is applied by the steps of depositing ink upon a screen having an ink permeable pattern in accordance with the aforesaid pattern; passing a surface medium to be imprinted towards a line of apogee in predetermined relation beneath the underside of the screen, moving the surface medium in diverging relation from the screen commencing at about the line of apogee, the medium and the screen being in substantial speed synchronized relation at the line of apogee whereby ink passing in discrete columns downwardly through the screen attaches to the surface and medium, and is drawn downwardly thereby as the screen and medium diverge. The discrete columns are then separated into an upper portion carried by the screen and a lower portion carried by and attached to the surface of the medium, wherein in parting the upper portion exerts an upward attractive tensile force upon the lower portion. It is surmised that the "necking" taking place as the ink portions separate promotes the ultimate formation of the highly desirable hemispherical dot shape.

The extent of deposition of the ink may be increased by the depth of the flood of ink being increased, and may be enhanced by the provision of an downward flow component by way era convergently inclined squeegee. The effectiveness of the squeegee may be further enhanced by the provision of an outwardly convex squeegee surface at or adjacent the point of contact with the screen. The effectiveness of the squeegee is also influenced by its softness. Squeegees having a low durmeter of 40 are known, and higher durometers my prove effective.

The motion of the medium in an arcuate outwardly convex path can then facilitate formation of the lower ink column portion into a non-slumping substantially hemispherical dot form upon the medium. Subsequent timely application of U/V light can forestall adverse slumping and effect curing of the deposited ink, to provide readable upstanding protrusions of readable Braille.

In practice, characters in the form of touch-readable hemispherical Braille dots have been produced by the present process. These characters are readable by one accustomed to reading Braille, and even by trainee Braille readers.

A substantially colorless, u/v curable ink may be used for printing the dots. This enables overprinting of cards or labels substantially without interference with the viewability of any existing printed matter or text that forms a part of the print medium.

In carrying out the process care must be taken to ensure that adhesion of the characters to the surface of the medium is adequate to withstand the wear and tear of normal usage.

BRIEF DESCRIPTION OF THE DRAWINGS

Certain embodiments of the invention are described, by way of illustration, without limitation of the invention thereto, other than as set forth in the accompanying claims hereof, reference being had to the accompanying drawings, wherein:

DETAILED DESCRIPTION OF THE INVENTION

Figure 4:
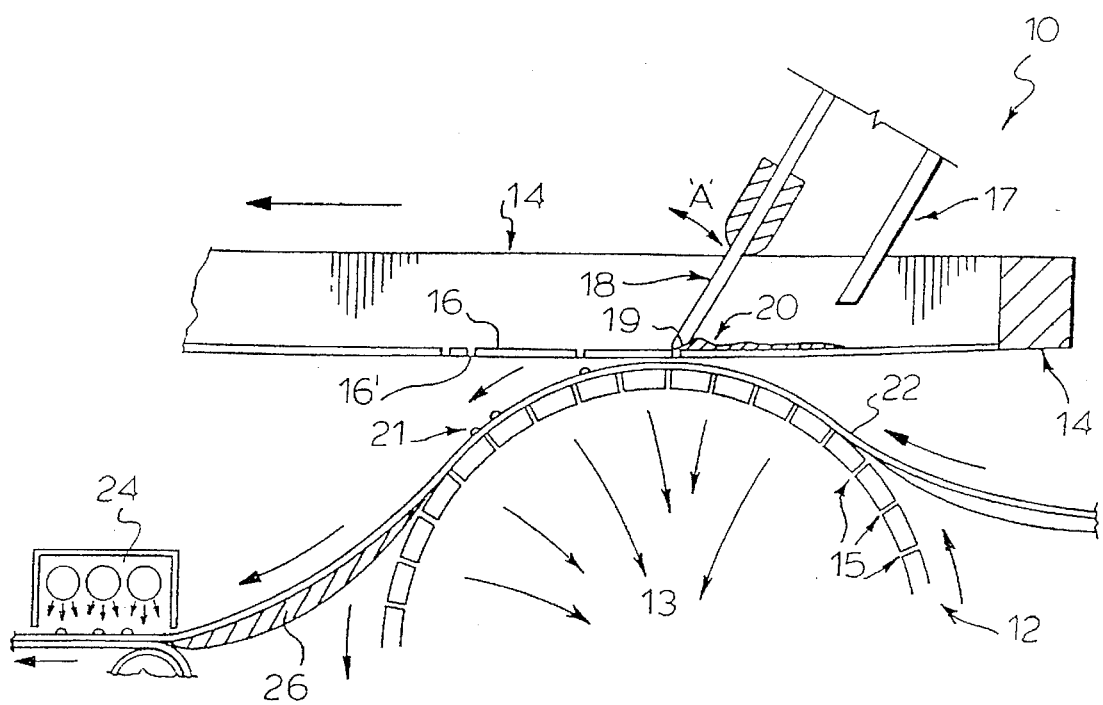
FIG. 4 is a schematic cross-section, looking in the cross-machine direction, showing a portion of a cylinder machine and the silk screen and frame.

Referring first to FIG. 4, a cylinder printing machine 10 has a rotatable cylinder 12, illustrated as having an apertured surface to which vacuum is applied, as indicated by the arrows 13. A planar silk screen bed 14 is mounted thereabove, for linear oscillation in synchronized relation with the rotation of the cylinder 12.

A silk screen 16 is mounted in tensioned relation upon the bed 14, having ink supply means 17 mounted in superposed relation thereover.

A squeegee 18 serves to localize an ink pool 20 that is deposited upon the screen 16, and to depress the silk screen downwardly into contact with the surface of a sheet of print medium 22.

The heel 19 of the squeegee 18 is downwardly and outwardly convexly curved, to assist the downward "pumping" action of the squeegee 18 provided by the angle of inclination "A" from normal.

The sheet of print medium 22, overlies approximately one half of the periphery of the cylinder 12 and, is secured by grippers, (not-shown).

Air suction also may be applied through the cylinder shell, for holding the print medium to the cylinder, as indicated by the air-flow arrows 13, for air entering through holes 15 in the cylinder 12.

Ultra-violet (U/V) curing lamps 24 located over an adjacent portion of a run-off belt on which the printed sheet is deposited, serve to cure the ink after deposition thereof upon the printed sheet 22.

The grippers operate automatically in known fashion to pick up a clean sheet 22 and retain it upon the cylinder 12 until it rotates through the printing zone, after which it is released from the cylinder 12, and passes over a doctor blade 26 onto a travelling belt, which carries the imprinted sheet to the adjacent curing section, having U/V lamps 24, after which it is released for inspection and packaging.

While the aforesaid process has been successfully carried out using a cylinder printing machine, it is contemplated that a rotary press may be substituted for the cylinder machine.

It has been found that using a cylinder machine 1200 to 1600 sheets per hour may be printed. This in effect reduces the cost per sheet to approximately one sixth the cost for that produced by the flat bed method.

The effective linear printing speed may vary in accordance with the stiffness of the stock being used as the print medium. The use of a stiffer stock permits effective printing to be achieved at higher speeds.

At a printing rate of 1600 sheets per hour, each sheet being of 28 inches in length, the linear printing speed is about 62 feet per minute thereby giving a curing time of less than one second.

In the case of rotary printing machines significantly higher linear speeds may be achieved.

The process has been found to be speed sensitive, with requisite speed required in order to effect adequate ink deposition while affording sufficient time in the curing section to effect adequate curing.

Figure 1:
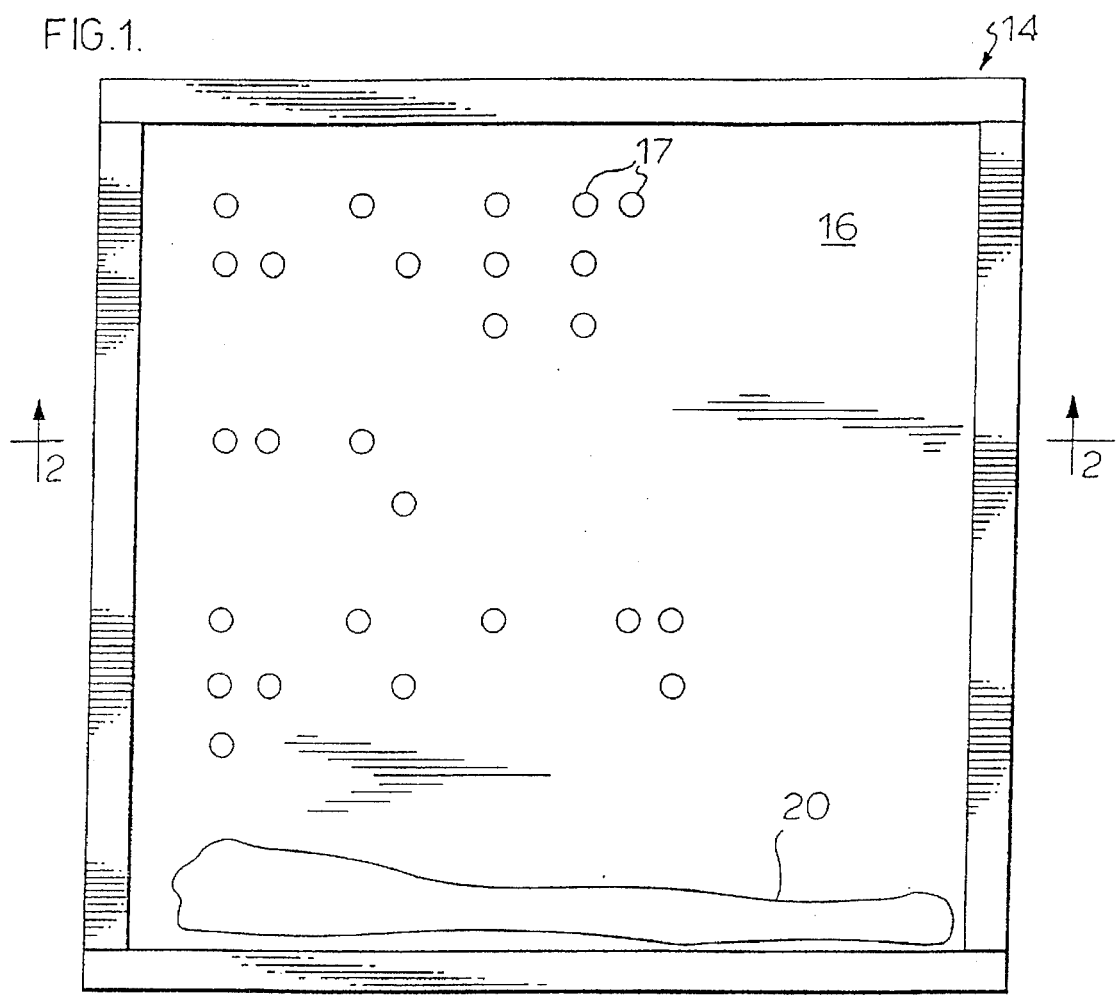
FIG. 1 is a plan view of a schematic representation of a silk screen and screen-frame combination, shown with the location of a preliminary ink flood for carrying out the present invention.

FIG. 1 shows the silk screen bed 14 having the screen 16 therein, with circular interstices 16' for the imprinting of raised Braille dots 21.

Figure 2:
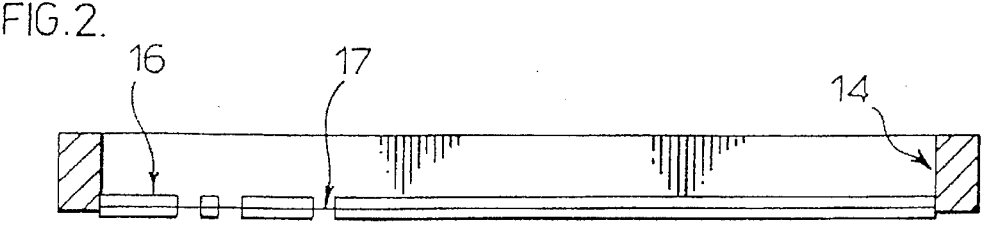
FIG. 2 is a sectional view taken at 2—2 of FIG. 1.

FIG. 2 shows the elements of FIG. 1 in side view.

Figure 3:
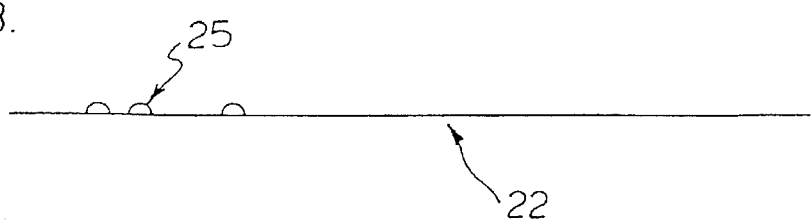
FIG. 3 is a detail showing deposited hemispherical dots upon a medium or substrate.

FIG. 3 shows the hemispherical dots 25, deposited in adhering relation upon the medium sheet 22.

In one example, colorless ink, identified as J9318 DC U/V Clear (Peace and Stevens) having a viscosity of 4500 cps, (centipoise) used in combination with a 90 mesh screen having an emulsion Kiwocol Polyplus (B&H Thompson) applied as second and fourth coats wet upon wet two coats plus two coats, and one coat on the reverse face, prior to exposure of the pattern, resulted in a Braille-readable standard of raised dots. While short tetra readability at a dot prominence of 6 Points has been established, the achievement of higher dot prominence is anticipated, using the present process.

It is contemplated that greater thickness of photosensitive emulsion may be used, such as increasing the number of coatings to a reasonable, desired extent that is found practicable.

What I claim by letters of the United States:

1. A machine printed, touch readable article having a relatively brief, touch-readable message comprising at least one Braille pattern of spaced-apart, raised dots on a surface of said article, said raised dots comprising a cured ink and having a height above said surface of at least six points and substantially less than nineteen points, wherein spacing between dots within a given character cell exceeds the United States Congressional Standard for such intra-cell dot spacing and is greater than 0.092 inches, centre to centre, and wherein spacing between dots of adjacent character cells exceeds the United States Congressional Standard for such intercell dot spacing and is greater than 0.245, inches centre to centre, whereby said relatively brief message formed from raised, Braille pattern ink dots is readily readable by a Braille reader of moderate skill.

2. The article as set forth in claim 1, said height being in the range of about 6 to about 10 points.

3. The article as set forth in claim 1, said dots being substantially hemispherical in shape.

4. The article as set forth in claim 1, said height being about 6 points.

5. The article as set forth in claim 1, wherein spacing between adjacent dots of adjacent lines of character cells is greater than 0.4 inches.

6. The machine printed article as set forth in claim 1, said message comprising substantially colorless ink.

7. The article as set forth in claim 1, wherein said ink is of a type which remains substantially unshrunk upon curing.

8. A method of printing a relatively brief, touch readable Braille message on a substrate using a relatively high viscosity ink, said method comprising:

providing a rotating drum and a reciprocating silk screen assembly disposed over said rotating drum, said silk screen assembly having predetermined areas, corresponding to said Braille message, that are permeable to said ink;

disposing said substrate on said rotating drum and carrying said substrate through a portion of a revolution of said drum;

moving said silk screen assembly across said rotating drum in synchronization with the rotation of said drum whereby the forward speed of the silk screen assembly is substantially the same as the tangential speed of the substrate;

as said substrate rotates past said silk screen assembly, forcing ink through said predetermined areas to deposit dots of ink on said substrate; and removing said substrate from said rotating cylinder.

9. The method of claim 8, further comprising curing said ink at high speed by U/V radiation in a substantially upstanding condition.

10. The method as set forth in claim 9, wherein said ink has a viscosity before curing that is greater than about 2000 cps.

11. The method as set forth in claim 10, wherein said ink has a viscosity before curing that is about 4500 cps.

12. The method of claim 8, wherein said message is printed on a plurality of substrates at a rate in the range of about 1200 to about 1600 substrate sheets per hour.

13. The method of claim 8, wherein said drum rotates with tangential speeds in excess of sixty feet per minute.

14. The method as set forth in claim 8, wherein said ink is concentrated as a flooded zone on an upper surface of said silk screen apparatus by means of a squeegee.

15. The method as set forth in claim 14, wherein said squeegee is inclined to form a convergent, wedge-shaped ink flood zone.

16. The method as set forth in claim 14, wherein said squeegee has a hardness as low as 40 durometer.

17. An article as set forth in claim 1 produced by a method as set forth in claim 8.

* * * * *